(12) United States Patent
Ranganathan et al.

(10) Patent No.: US 9,697,168 B2
(45) Date of Patent: Jul. 4, 2017

(54) APPARATUS, SYSTEM AND METHOD FOR SHARING PHYSICAL LAYER LOGIC ACROSS MULTIPLE PROTOCOLS

(71) Applicants: Sridharan Ranganathan, San Ramon, CA (US); Satheesh Chellappan, Folsom, CA (US)

(72) Inventors: Sridharan Ranganathan, San Ramon, CA (US); Satheesh Chellappan, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 289 days.

(21) Appl. No.: 14/668,886

(22) Filed: Mar. 25, 2015

(65) Prior Publication Data

US 2016/0283434 A1 Sep. 29, 2016

(51) Int. Cl.
| | |
|---|---|
| *G06F 13/00* | (2006.01) |
| *G06F 13/38* | (2006.01) |
| *G06F 13/40* | (2006.01) |
| *G06F 13/42* | (2006.01) |
| *G06F 1/32* | (2006.01) |

(52) U.S. Cl.
CPC ......... *G06F 13/4291* (2013.01); *G06F 1/324* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| | | | |
|---|---|---|---|
| 7,913,022 B1* | 3/2011 | Baxter | G06F 13/1605 326/38 |
| 2012/0026974 A1 | 2/2012 | Fong | |
| 2013/0286951 A1 | 10/2013 | Viswanathan et al. | |
| 2014/0086363 A1 | 3/2014 | Yang | |
| 2014/0269471 A1* | 9/2014 | Wagh | H04W 52/0203 370/311 |

(Continued)

FOREIGN PATENT DOCUMENTS

KR 1020120113843 10/2012

OTHER PUBLICATIONS

International Search Report and Written Opinion for PCT Application No. PCT/US2016/017412, mailed on Jun. 13, 2016, 9 pages.

*Primary Examiner* — David E Martinez
(74) *Attorney, Agent, or Firm* — Blakely, Sokoloff, Taylor & Zafman LLP

(57) ABSTRACT

Techniques and mechanisms to provide common interface logic for multiple protocol engines to access physical layer circuitry at different times. In an embodiment, a state machine of an interface device is to participate in exchanges with physical layer resources on behalf of any of various protocol engines coupled to the interface device via different respective interfaces. Based on state transitions by the state machine, circuitry corresponding to a particular one of such interfaces may selectively send a clock signal for operation of a port controller attempting to access the physical layer circuitry. In some embodiments, multiple interface devices are configured to provide an hierarchical interface architecture for more than two port controllers that variously support at least two protocols.

23 Claims, 11 Drawing Sheets

(56) References Cited

U.S. PATENT DOCUMENTS

| | | |
|---|---|---|
| 2014/0289434 A1 | 9/2014 | Rangananthan et al. |
| 2015/0220140 A1* | 8/2015 | Por .................... G06F 13/4221 |
| | | 710/314 |

* cited by examiner

APPARATUS, SYSTEM AND METHOD FOR SHARING PHYSICAL LAYER LOGIC ACROSS MULTIPLE PROTOCOLS

BACKGROUND

1. Technical Field

The present invention relates to computer devices and more particularly, but not exclusively, to managing access to physical layer hardware.

2. Background Art

Conventional communication devices often operate with a protocol stack including a physical layer, a link layer and a protocol layer. A physical layer (PHY) includes analog components and, in many applications, operates to transfer data from an integrated circuit (IC) to a board, connector, cable or the like. Unfortunately, due to pin and die constraints, a system-on-chip (SoC) and other such ICs can only support a limited number of PHYs. These ICs tend to be particularly useful in mobile applications.

Certain PHY standards for power-constrained applications, such as various mobile PHY (M-PHY) specifications issued by the MIPI® Alliance, support operation with any of multiple protocols including Universal Flash Storage (UFS), SuperSpeed USB Inter-chip (SSIC), Low Latency Interface (LLI), Mobile Peripheral Component Interconnect Express (M-PCIe) and Third Generation MIPI® Camera Serial Interface (CSI-3). PHYs that conform to such standards usually support modes to implement different data rates, and tend to be heavily constrained with respect to power, clock and/or other resource management. PHYs conforming to such a standard have, to date, been limited to supporting only one protocol stack—and thus only a single protocol—due in part to the resource management constraints imposed by the standard.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
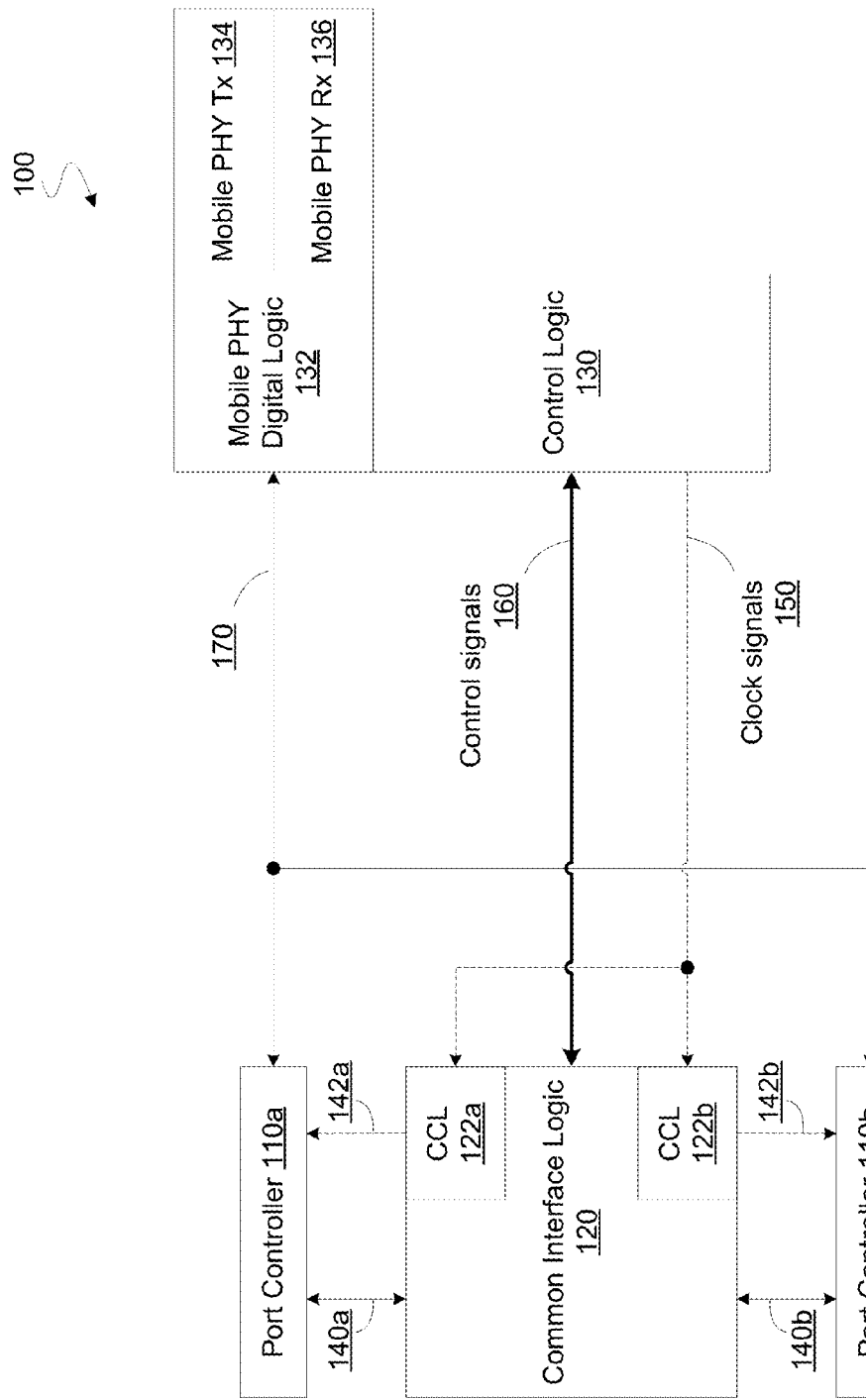
FIG. 1 is a high-level functional block diagram illustrating elements of a system for variously exchanging communications using any of multiple protocols according to an embodiment.

While the present disclosure is described herein with reference to illustrative embodiments for particular applications, it should be understood that such embodiments are exemplary only and that the invention as defined by the appended claims is not limited thereto. Indeed for the sake of illustration the technologies described herein may be discussed in the context of one or more use models in which port controllers supporting different protocols are provided with a common interface to access the same physical layer resources. Such discussions are exemplary only, and it should be understood that all or a portion of the technologies described herein may be used in other contexts. Indeed the technologies described herein may be used with any suitable cache device and storage device. Those skilled in the relevant art(s) with access to the teachings provided herein will recognize additional modifications, applications, and embodiments within the scope of this disclosure, and additional fields in which embodiments of the present disclosure would be of utility.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. Such devices may be portable or stationary. In some embodiments the technologies described herein may be employed in a desktop computer, laptop computer, smart phone, tablet computer, netbook computer, notebook computer, personal digital assistant, server, combinations thereof, and the like. More generally, the technologies described herein may be employed in any electronic device to which multiple port controllers are configured to access the same physical layer circuitry.

Embodiments discussed herein variously provide techniques and/or mechanisms to access physical layer hardware for communications according to any of various protocols. The physical layer hardware may comply with requirements of a mobile physical layer standard such as the MIPI® Alliance Specification for M-PHY Version 3.0 announced Oct. 8, 2013, the MIPI® Alliance Specification for M-PHY$^{SM}$ Version 1.00.00 of Feb. 8, 2011 (approved Apr. 28, 2011) or the like. For brevity, a mobile physical layer is referred to herein with the abbreviation "M-PHY".

Common interface logic (e.g., including hardware, firmware and/or executing software) may provide, according to an embodiment, resource management including, for example, management of clock signaling and/or power states. As used herein, "common interface" refers to the feature of facilitating both (1) exchanges between a first port controller of a platform and a M-PHY of the platform, and (2) other exchanges between a second port controller of the platform and that same M-PHY. A common interface architecture may direct a M-PHY to output clocks and enter power states as variously requested at different times by port controllers supporting different respective protocols. Common interface logic may operate with configuration circuitry of the M-PHY—e.g., where such operation accounts for various rates of operation and/or power modes that various protocols may request. Alternatively or in addition, the common interface logic may manage the configuration of the M-PHY by using a common configuration clock. The common interface logic may also be responsible for variously multiplexing between different protocol engines for an exchange by one protocol engine with the M-PHY.

In some embodiments, a hierarchical interface architecture is configured to accommodate clock requests and/or power requests from more than two port controllers, where at least two such port controllers support different respective protocols. Such interface logic may be implemented hierarchically—e.g., with an interface block at a first level to arbitrate between multiple port controllers that belong to the same protocol, and another interface block at a second level to arbitrate between different protocols.

This architecture may provide a scalable mechanism to implement multiple M-PHYs—e.g., in a system-on-chip (SoC)—and to variously share those M-PHYs across multiple protocols. Such protocol sharing may be provided without compromising power and clock management functionality of the M-PHY technology used. Sharing of M-PHYs in a SoC may be critical for some mobile platforms because of the increasing need to support for multiple MPHYs for applications such as SSIC, UFS, LLI and CSI-3. Some embodiments variously provide a common interface that supports tight coupling between a M-PHY and each of multiple port controllers, managing the power consumed, to share the M-PHY across different protocols.

FIG. 1 illustrates elements of a system 100 to provide access to mobile physical layer hardware according to an embodiment. System 100 may include—or operate as a component of—a computer, tablet, smart phone or other device capable of exchanging signals internally or externally via M-PHY hardware. For example, some or all of system 100 may reside on a system-on-chip (SoC) or other hardware to operate as a component of a hardware platform.

M-PHY hardware of system 100 may include circuitry for at least one transceiver, as represented by the illustrative mobile PHY digital logic 132, mobile PHY transmitter (Tx) 134, and mobile PHY receiver (Rx) 136. M-PHY Tx 134 and M-PHY Rx 136 may transmit signals and receive signals, respectively, with an agent that is included in a platform comprising system 100 or (alternatively) remote from such a platform. As discussed herein, system 100 provides for different port controllers to variously access the M-PHY hardware at different times—e.g., for different internal and/or external agents may be variously accessed by such port controllers via M-PHY Tx 134 and M-PHY Rx 136. Mobile PHY digital logic 132 may provide digital domain processing of signals to be transmitted via M-PHY Tx 134 and/or signals received via M-PHY Rx 136. Such digital domain processing may include, but is not limited to, Bb10b encoding and/or decoding processing, parallel-to-serial (and/or serial-to-parallel) processing, clock and data recovery and/or the like. The M-PHY hardware may further comprise control logic 130 to regulate operation of the at least one transceiver. For example, control logic 130 may manage power states, clocking and/or other operations of the M-PHY hardware. In an embodiment, the M-PHY hardware includes one or more additional transceivers (not shown)—e.g. where control logic 130 regulates power states, clocking and/or other state of some or all such transceivers. Operations of the M-PHY hardware may be adapted from conventional M-PHY techniques, which are not detailed herein to avoid obscuring features of some embodiments. For example, such M-PHY operations may be compatible with the MIPI® Alliance Specification for M-PHY Version 3.0 announced Oct. 8, 2013 or any of various other M-PHY specifications of the MIPI® Alliance.

Exchanges by the M-PHY hardware of system 100 may, at different times, be on behalf of different protocol engines included in or coupled to system 100. For example, system 100 may include port controllers 110a, 110b each to variously exchange respective signals via one or both of mobile PHY Tx 134 and mobile PHY Rx 136. Port controllers 110a, 110b may include or operate on behalf of respective protocol engines (e.g., a protocol layer of a stack) that, for example, are compatible with different one of multiple protocol standards. By way of illustration and not limitation, such standards may include, but are not limited to, a SuperSpeed USB Inter-Chip (SSIC) standard such as that of the SSIC Specification released Jun. 20, 2012 by the USB 3.0 Promoter Group, a Universal Flash Storage (UFS) standard such as the Specification for UFS Version 2.0, JESD220B, published September, 2013 by the Joint Electron Device Engineering Council (JEDEC) Solid State Technology Association, the Specification for UFS Version 1.1, JESD220A, published June, 2012 by the JEDEC Solid State Technology Association, or the Specification for UFS Version 1.0, JESD220, published February, 2011 by the JEDEC Solid State Technology Association, a Low Latency Interface (LLI) standard such as that of the MIPI® Alliance Specification for LLI v2.0 announced Feb. 27, 2013, a camera serial interface standard such as that of the MIPI® Alliance Specification for Camera Serial Interface (CSI-3) announced Feb. 27, 2013, a Mobile Peripheral Component Interconnect Express (M-PCIe™) specification such as that announced on Jun. 25, 2013 by the Peripheral Component Interconnect Special Interest Group (PCI-SIG), and/or the like.

System 100 may implement different operational modes at different times, including a mode for port controller 110a to exchange signals via M-PHY resource of system 100, and another mode for port controller 110b (rather than port controller 110a) to exchange signals via those same M-PHY resources. In some embodiments, at most one of port controllers 110a, 110b is attempting to access the M-PHY at a given time. Certain embodiments variously provide interface mechanisms, as represented by the illustrative common interface logic (CIL) 120 of system 100, to facilitate operation of M-PHY resources with different protocols at different times. Although certain embodiments are not limited in this regard, CIL 120 may reside on a SoC that, for example, includes one or more of port controller 110a, port controller 110b and M-PHY circuitry including control logic 130, mobile PHY digital logic 132, mobile PHY Tx 134, and mobile PHY Rx 136.

At a given time during operation of system 100, port controller 110a may exchange control signals 140a, according to a first protocol, to regulate data exchanges with the M-PHY—e.g., where such data exchanges are via the illustrative one or more data paths 170. At another time during operation of system 100, port controller 110b may exchange other control signals 140b according to a second protocol to regulate data exchanges with the M-PHY. Such data exchanges may be via one or more data paths 170 or alternate data paths (not shown), in various embodiments. Control signals 140a, 140b may variously request or determine clocking and/or power states of the M-PHY transceiver. For example, control signals 140a, 140b may variously indicate that the M-PHY is to provide one of at least two possible clock signals, where a frequency of one clock signal is greater than that of the other clock signals. For brevity, such a relatively high frequency clock is referred to herein as a high-speed (hs) clock, and such a relatively low frequency clock is referred to herein as a pulse-width modulated (pwm) clock (where the lower clock frequency is typically used for relatively low power states of the M-PHY logic and/or port controller logic).

When port controller 110a is attempting to access the M-PHY transceiver, CIL 120 and control logic 130 may variously exchange control signals 160 based on some of control signals 140a and/or to generate others of control signals 140a. Similarly, when port controller 110b is attempting to access the M-PHY transceiver, CIL 120 and control logic 130 may variously exchange control signals 160 based on some of control signals 140b and/or to generate others of control signals 140b. Based on control signals 160, control logic 130 may variously transition the M-PHY transceiver between different power states. Alternatively or in addition, control logic 130 may variously provide one or more clock signals 150 to regulate exchanges between the M-PHY transceiver and one of power controllers 110a, 110b. CIL 120 may variously provide respective clock signals to port controllers 110a, 110b based on the one or more clock signals 150 and the exchange of control signals 140a, 140b, 160. For example, clock signals 142a, 142b may be provided—respectively, by clock control logic (CCL) 122a, 122b of CIL 120—at different times to port controllers 110a, 110b.

Figure 2:
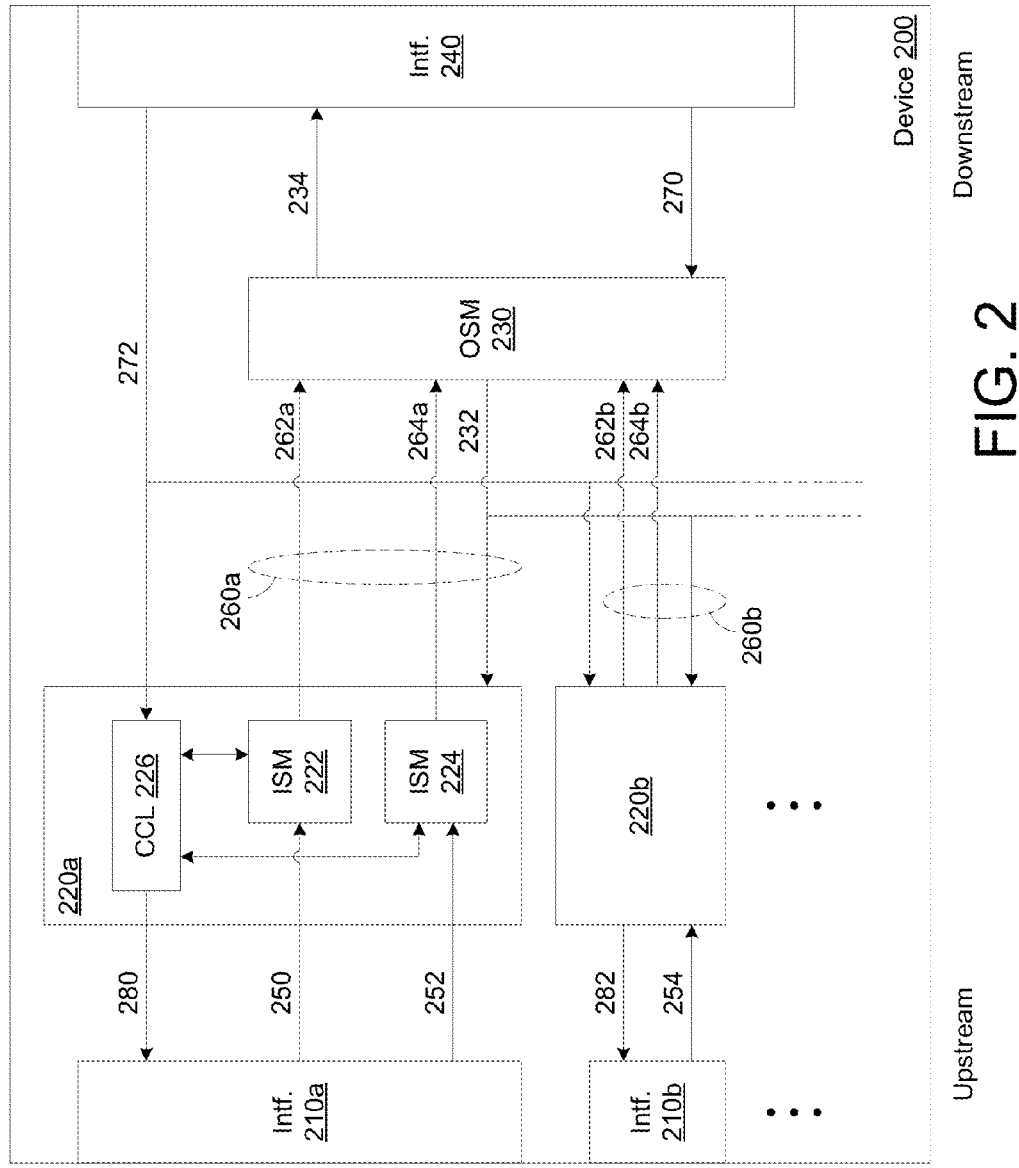
FIG. 2 is a high-level functional block diagram illustrating elements of a device for providing a common interface with physical layer circuitry according to an embodiment.

FIG. 2 illustrates elements of a device 200 to provide access to M-PHY hardware according to an embodiment. Device 200 may aid in the management of clocking and power states of an M-PHY—e.g., as described with reference to system 100. For example, device 200 may include some or all of the features of CIL 120. To aid in the description of certain features of various embodiments, the label "upstream" is used herein to refer to components of common interface logic that are configured to be relatively far from a M-PHY—e.g., as compared to other "downstream" components of such common interface logic that are configured to be relatively close to the M-PHY. However, it will be appreciated that such labels are simply a naming convention.

In an embodiment, device 200 includes different upstream hardware interfaces—e.g., as represented by the illustrative interfaces 210a, 210b, . . . —to variously directly or indirectly couple device 200 each to a different respective port controller. For example, interfaces 210a, 210b may couple device 200 directly to port controllers 110, 110b, respectively. Alternatively, one or each of interfaces 210a, 210b may couple device 200 to a respective functional block of common interface logic that, in turn, is coupled (directly or indirectly) to respective port controllers. Device 200 may further comprise a downstream interface 240 to couple device 200 directly or indirectly to M-PHY hardware of a platform that is to include device 200. For example, interface 240 may couple device 200 to such M-PHY hardware via another functional block of common interface logic providing functionality similar to that of device 200. Interfaces 210a, 210b, 240 may each comprise respective contacts including, but not limited to, various pads, balls, pins and/or other coupling hardware. It will be appreciated that interfaces 210a, 201b, . . . are functionally (e.g., logically) distinct from one another, but may be physically adjoined or otherwise combined with one another.

Device 200 may include, for each of upstream interfaces 210a, 210b, . . . , respective circuitry to receive signals from the upstream interface and to generate signals to be transmitted via the respective upstream interface. For example, circuitry 220a may be configured to exchange control signals with interface 210a, and circuitry 220b to exchange control signals with interface 210b. Such circuitry may in turn be variously configured each to exchange respective signals with a state machine logic OSM 230 of device 200. In an illustrative scenario according to one embodiment, circuitry 220a may exchange internal request signals 260a with OSM 230 during a period of time when a port controller, coupled via interface 210a, is attempting to access the M-PHY. Alternatively or in addition, circuitry 220b may exchange internal request signals 260b with OSM 230 during another period of time when a different port controller, coupled via interface 210b, is attempting to access the M-PHY.

Based on signal exchanges with one of circuitry 220a, 220b, . . . , OSM 230 may send via interface 240 one or more requests 234 for power state management, clock management and/or other control functionality—e.g., by M-PHY control logic 130 or other such logic. In response, OSM 230 may receive via interface 240 one or more acknowledgement messages 270 indicating state of the M-PHY. Based on the one or more acknowledgement messages 270, OSM 230 may perform operations—e.g., with the one of circuitry 220a, 220b, . . . —to control clock signaling to be sent to a port controller.

For example, interface 270 may receive one or more clock signals 272 (such as one of the one or more clock signals 150) that are available to any of circuitry 220a, 220b, . . . . Certain features of various embodiments are described herein with respect to processing of clock signal 272 with circuitry 220a. Such description may be extended to additionally or alternatively apply to processing of clock signal 272 by circuitry 220b or other such circuitry of device 200.

In an embodiment, one or more clock signals 272 are provided to clock control logic (CCL) 226 that, for example, is variously responsive to each of state machines ISM 222, ISM 224 of circuitry 220a. For example, state transitions of ISM 222 may be based on requests 250 received via interface 210a, one or more signals 232 indicating current state of OSM 230 and/or feedback signaling from CCL 226. Based on such state transitions, ISM 222 may send to OSM 230 requests 262a—e.g., where requests 262a include a request for a high-speed clock signal. Alternatively or in addition, state transitions by ISM 222 may result in signaling for CCL 226 to provide a high speed clock signal as at least part of clock signaling 280 to a port controller coupled via interface 210a (or via other interconnect hardware). Concurrently, state transitions of ISM 224 may be based on requests 252 received via interface 210a, the one or more signals 232 and/or other feedback signaling from CCL 226. Based on such state transitions, ISM 224 may send to OSM 230 one or more requests 264a including, for example, a request for a power managed (e.g, low speed) clock signal. Alternatively or in addition, state transitions by ISM 224 may result in signaling for CCL 226 to provide a power managed clock signal as at least part of clock signaling 280.

When a different port controller is attempting to access the M-PHY, other signal exchanges, state machine transitions, clocking signals, etc. may be similarly performed on behalf of a different port controller—e.g., with state machine logic and clock control logic (not shown) of circuitry 220b. By way of illustration and not limitation, requests 254 exchanged from interface 210b to circuitry 220b may correspond functionally to some or all of requests 250, 252, and clock signaling 282 exchanged from circuitry 220b to interface 210b may correspond functionally to clock signaling 280. Alternatively or in addition, requests 262b, 264b of internal request signals 260b may be exchanged from circuitry 220b to OSM 230, where requests 262b, 264b of signals 260b correspond functionally to requests 262a, 264a of internal request signals 260a.

Figure 3:
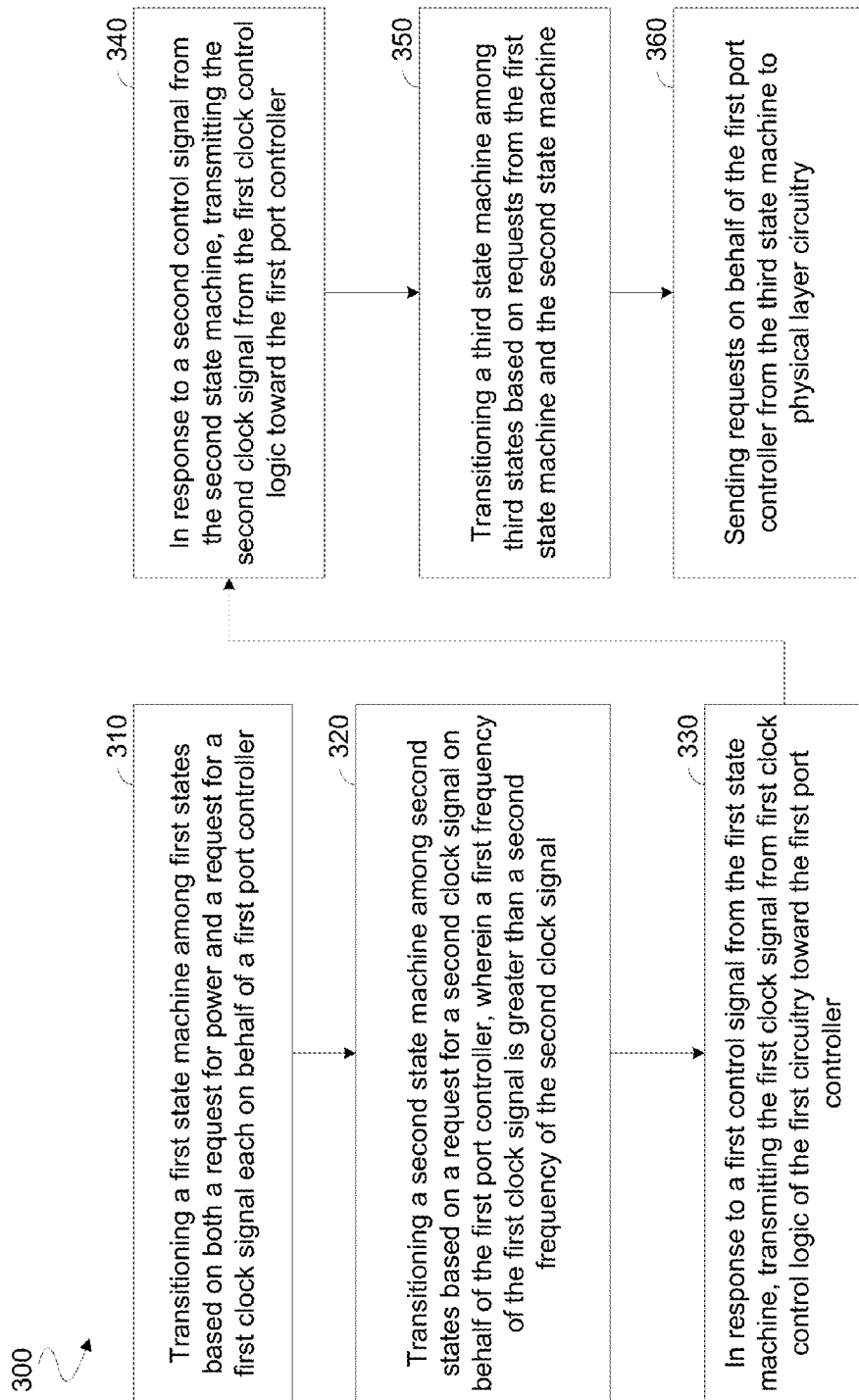
FIG. 3 is a flow illustrating elements of a method for providing access to physical layer circuitry according to an embodiment.

FIG. 3 illustrates elements of a method 300 for providing access to physical layer circuitry using common interface logic according to an embodiment. Method 300 may be performed for any of multiple port controllers—e.g., including port controllers 110a, 110b—each to variously exchange communications at different times using different respective protocols but the same M-PHY transceiver. Method 300 may be performed with common interface logic having some or all of the features of CIL 120 or device 200. To illustrate certain features of various embodiments, method 300 is described herein with reference to operations by circuitry 220a of device 200. However, such description may be extended to additionally or alternatively apply to other circuitry of device 200 (e.g., circuitry 200b) and/or to other common interface logic described herein.

Method 300 may include, at 310, transitioning a first state machine of first circuitry among first states based on both a request for power and a request for a first clock signal. The respective requests for power and a first clock signal may be received by the common interface logic each on behalf of a first port controller. The transitioning at 310 may include implementing a state machine such as ISM 222 with hardware and/or software—e.g., where requests 250 include the request for power and the request for the first clock signal.

In an embodiment, method 300 further comprises, at 320, transitioning a second state machine of the first circuitry among second states based on a request for a second clock signal on behalf of the first port controller. A first frequency of the first clock signal may be greater than a second frequency of the second clock signal. For example, the transitioning at 320 may include implementing with hardware and/or software a state machine such as ISM 224—e.g., where requests 252 include the request for the second clock signal.

In response to a first control signal from the first state machine, method 300 may, at 330, transmit the first clock signal from first clock control logic of the first circuitry toward the first port controller. For example, the transmitting at 330 may include ISM 222 sending the first control signal to logic of CCL 226 that is to control the generation of a relatively high frequency clock signal, where such generating is further based on another high speed clock signal received by the common interface logic—e.g., from a M-PHY controller.

In response to a second control signal from the second state machine, method 300 may, at 340, transmit the second clock signal from the first clock control logic of the first circuitry toward the first port controller. For example, the transmitting at 340 may include ISM 224 sending the second control signal to other logic of CCL 226 that is to control the generation of a relatively low frequency clock signal, where such generating is further based on another low speed clock signal received by the common interface logic—e.g., from the M-PHY controller.

Method 300 may further comprise, at 350, transitioning a third state machine of the first circuitry among third states based on requests from the first state machine and the second state machine. One example of the transitioning at 350 includes implementing a hardware and/or software state machine such as OSM 230—e.g., where state transitions by OSM 230 are based at least in part on requests 262a, 264a of signals 260a.

In an embodiment, method 300 performs, at 360, sending requests on behalf of the first port controller from the third state machine to physical layer circuitry. Such requests may include one or more of a request for a high speed clock, a request for a low speed clock, a power request, and/or one or more other requests to configure state of a M-PHY. In the example of device 200, the sending of requests at 360 may include OSM 230 sending requests 234 to an M-PHY via downstream interface 240.

Figure 4:
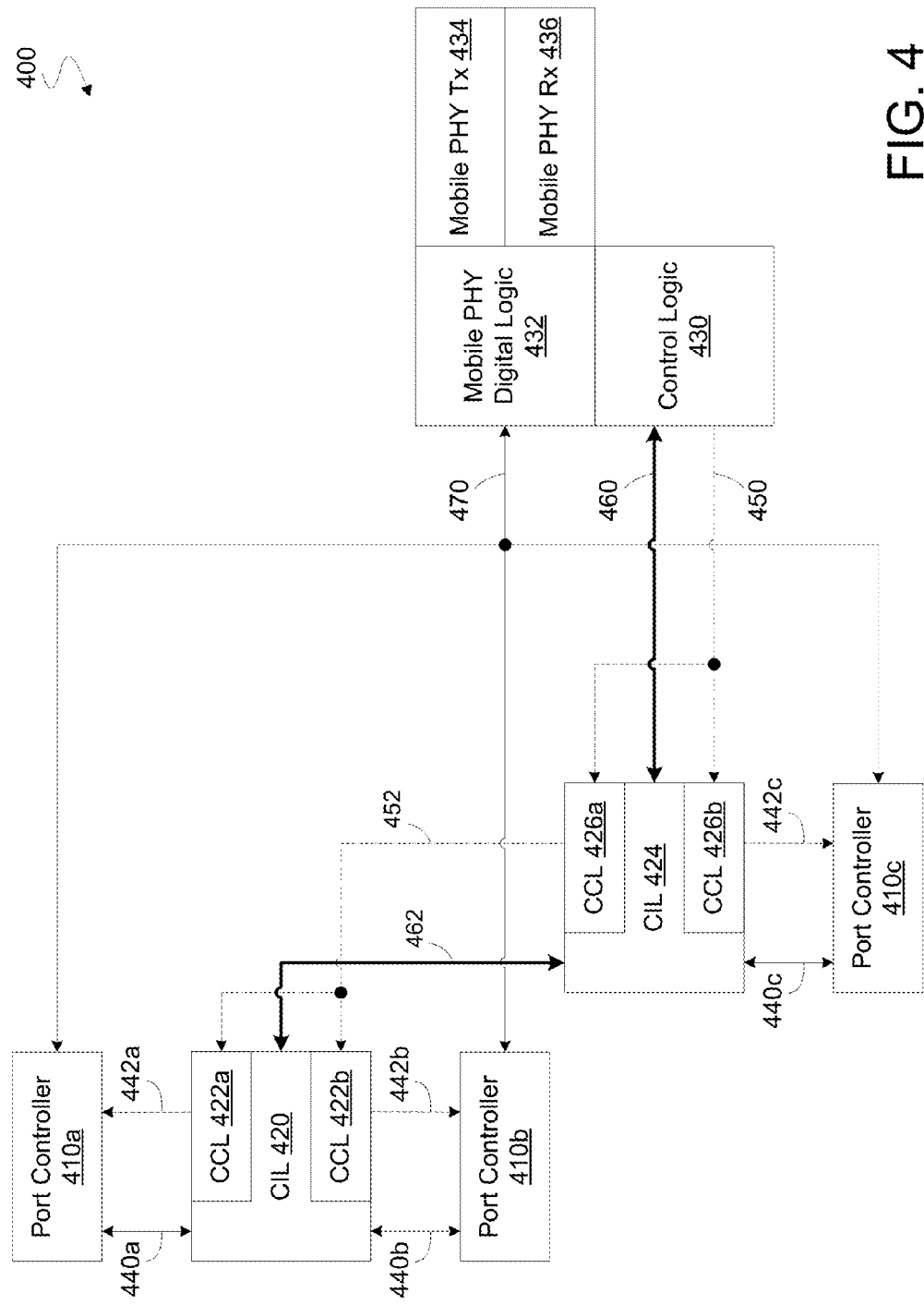
FIG. 4 is a high-level functional block diagram illustrating elements of a system for providing access to physical layer circuitry according to an embodiment.

FIG. 4 illustrates elements of a system to provide access to physical layer hardware using a hierarchical common interface architecture according to an embodiment. System 400 may by a computer, tablet, smart phone or other device (or a component thereof) capable of exchanging signals internally or externally via M-PHY hardware. M-PHY hardware of system 400 may include control logic 430, mobile PHY digital logic 432, a mobile PHY Tx 434 and a mobile PHY Rx 436 that, for example, provide some or all of the respective functionality of control logic 130, mobile PHY digital logic 132, mobile PHY Tx 134 and mobile PHY Rx 136.

To facilitate operation of M-PHY resources with different protocols at different times, system 400 may include multiple functional blocks of common interface logic configured hierarchically, with respect to one another. An example of such a hierarchical architecture according to an embodiment is represented by the illustrative CIL 420 and CIL 424 of system 400. CIL 420 and CIL 424 may each provide some of all of the functionality of CIL 120 or device 200—e.g., wherein CIL 420 and CIL 424 each perform a respective implementation of method 300.

In an illustrative scenario according to one embodiment, system 400 includes port controllers 410a, 410b that are each upstream of CIL 420, and a port controller 410b that is upstream of CIL 424. CIL 420 may also be upstream of CIL 424, where CIL 424 is configured to participate in control signal exchanges with control logic 430 on behalf of CIL 420 (and one of port controllers 410a, 410b attempting M-PHY access). In an embodiment, port controllers 410a, 410b include respective protocol engines each to support communications according to the same protocol. By contrast, port controller 410c may include a protocol engine to support communications according to a different protocol. CIL 420 may serve as one hierarchical layer to provide interface functionality that resolves between different port controllers of the same protocol, and CIL 424 may serve as another hierarchical layer to provide interface functionality that resolves between different protocols.

At different times, port controllers 410a, 410b may exchange respective control signals 440a, 440b with CIL 420 to regulate data exchanges with the M-PHY—e.g., where such data exchanges are via the illustrative one or more data paths 470. At still other times, port controller 410c may exchange control signals 440c with CIL 424 to regulate data exchanges with the M-PHY—e.g., via one or more data paths 470. Where one of port controllers 410a, 410b is attempting to access M-PHY resources, CIL 420 may exchange control signals 462 with CIL 424. CIL 424 may exchange clock signals 450 and control signals 460 with control logic 430. Based on such exchanges, clock control logic (CCL) 426b of CIL 424 may variously provide clock signals 442c to port controller 410c and/or CCL 426a of CIL 424 may variously provide clock signals 452 to CCL 422a, 422b of CIL 420. Where one of port controllers 410a, 410b is attempting to access M-PHY resources, CIL 420 may variously exchange clock signals 442*a* with port controller 410*a* or clock signals 442*b* with port controller 410*b*.

Figure 5:
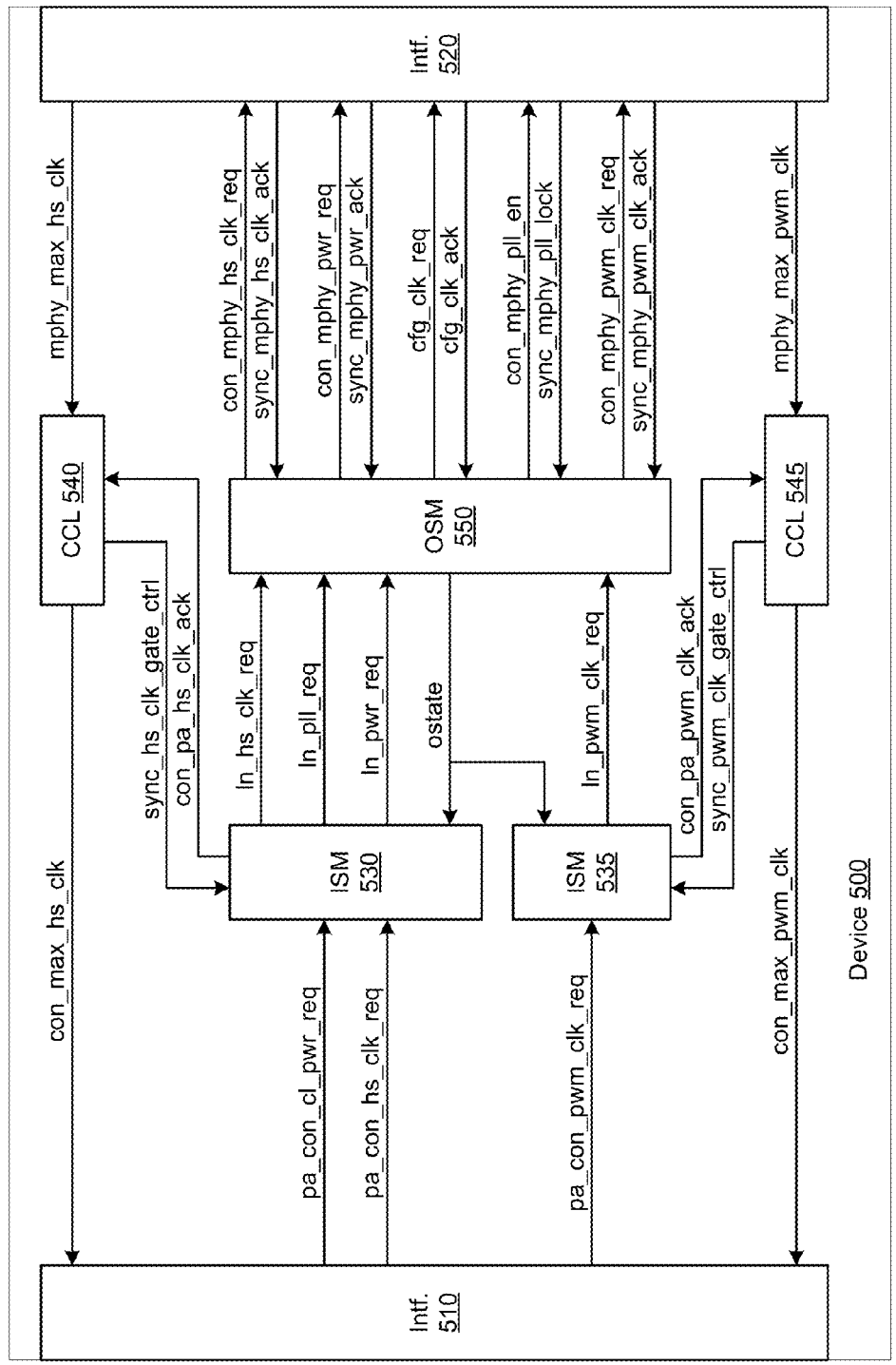
FIG. 5 is a high-level functional block diagram illustrating elements of a device to provide a common interface with physical layer circuitry according to an embodiment.

FIG. 5 illustrates elements of a device 500 to provide access to M-PHY hardware according to an embodiment. Device 500 may include some of all of the features of device 200, for example. In an embodiment, device is configured to perform method 300—e.g., where device 500 operates as one of CIL 120, CIL 420, CIL 424. Device 500 comprises a downstream interface 520 to couple directly or indirectly (e.g., via other common interface logic) to control logic of a M-PHY.

At a given time, a state machine OSM 550 of device 500 may operate to exchange control signals via interface 520 (e.g., interface 120*a*) based on signals exchanged between OSM 550 and circuitry that, of multiple upstream interfaces of device 500, is dedicated to or otherwise corresponds to only one such upstream interface. For example, device 500 may include an upstream interface 510 to couple device 500 to an upstream device such as a port controller or to other common interface logic. Circuitry of device 500 that is dedicated to upstream interface 510 may include state machines ISM 530, ISM 535 and clock control logic CCL 540, CCL 545. In an embodiment, ISM 530 and ISM 535 provide the respective functionality of ISM 222 and ISM 224—e.g., where CCL 540 and CCL 545 variously provide respective functionality of CCL 226. As illustrated in device 200, for example, device 500 may comprise one or more additional upstream interfaces and respective dedicated circuitry for each such upstream interface (not shown), where each such dedicated circuitry includes state machine logic and clock control logic that is configured to operate with the same OSM 550.

Table 1 below describes some control and timing signals variously exchanged with or otherwise used by circuitry of device 500, according to an embodiment.

TABLE 1

| Signals Exchanged with Common Interface Logic | |
| --- | --- |
| Signal Name | Description |
| cfg_clk | Configuration clock |
| cfg_clk_ack | Configuration clock acknowledgement |
| cfg_clk_req | Configuration clock request |
| clk_lat_tolerance | Latency tolerance acceptable for the port controller |
| con_max_hs_clk | HS clock to port controller |
| con_max_pwm_clk | PWM clock to port controller |
| con_mphy_hs_clk_req | HS clock request |
| con_mphy_pll_en | PLL enabled |
| con_mphy_pwm_clk_req | PWM clock request |
| con_mphy_pwr_req | Power request |
| con_pa_hs_clk_ack | HS clock acknowledgement |
| con_pa_pwm_clk_ack | PWM clock acknowledgement |
| ln_hs_clk_req | Internal HS clock request |
| ln_pll_req | Internal PLL clock request |
| ln_pwm_clk_req | Internal PWM clock request |
| ln_pwr_req | Internal power request |
| mphy_max_hs_clk | HS clock input |
| mphy_max_pwm_clk | PWM clock input |
| ostate | OSM current state |
| pa_con_cl_pwr_req | Power request |
| pa_con_hs_clk_req | HS clock request |
| pa_con_pwm_clk_req | PWM clock request |
| pwu_d3 | Device in lower power (e.g., D3) |
| rst_n | Active low reset |
| sync_hs_clk_gate_ctrl | Feedback from HS CG enable |
| sync_mphy_hs_clk_ack | HS clock acknowledge (synched w/cfg_clk) |
| sync_mphy_pwm_clk_ack | PWM clock acknowledge (synched w/cfg_clk) |

TABLE 1-continued

| Signals Exchanged with Common Interface Logic | |
| --- | --- |
| Signal Name | Description |
| sync_mphy_pll_lock | PLL locked/stable (synched w/cfg_clk) |
| sync_mphy_pwr_ack | Power acknowledgement (synched w/cfg_clk) |
| sync_pwm_clk_gate_ctrl | Internal feedback from PWM clock gate enable |

In an embodiment, ISM 530 is configured to recognize, for either a power request (pa_con_cl_pwr_req) or a high speed clock request (pa_con_hs_clk_req), any of various control signals—each according to different respective protocol—as being that request. Alternatively or in addition, ISM 535 may be configured to recognize any of various control signals—each according to different respective protocol—as being a power managed clock request (pa_con_pwm_clk_req).

Figure 6:
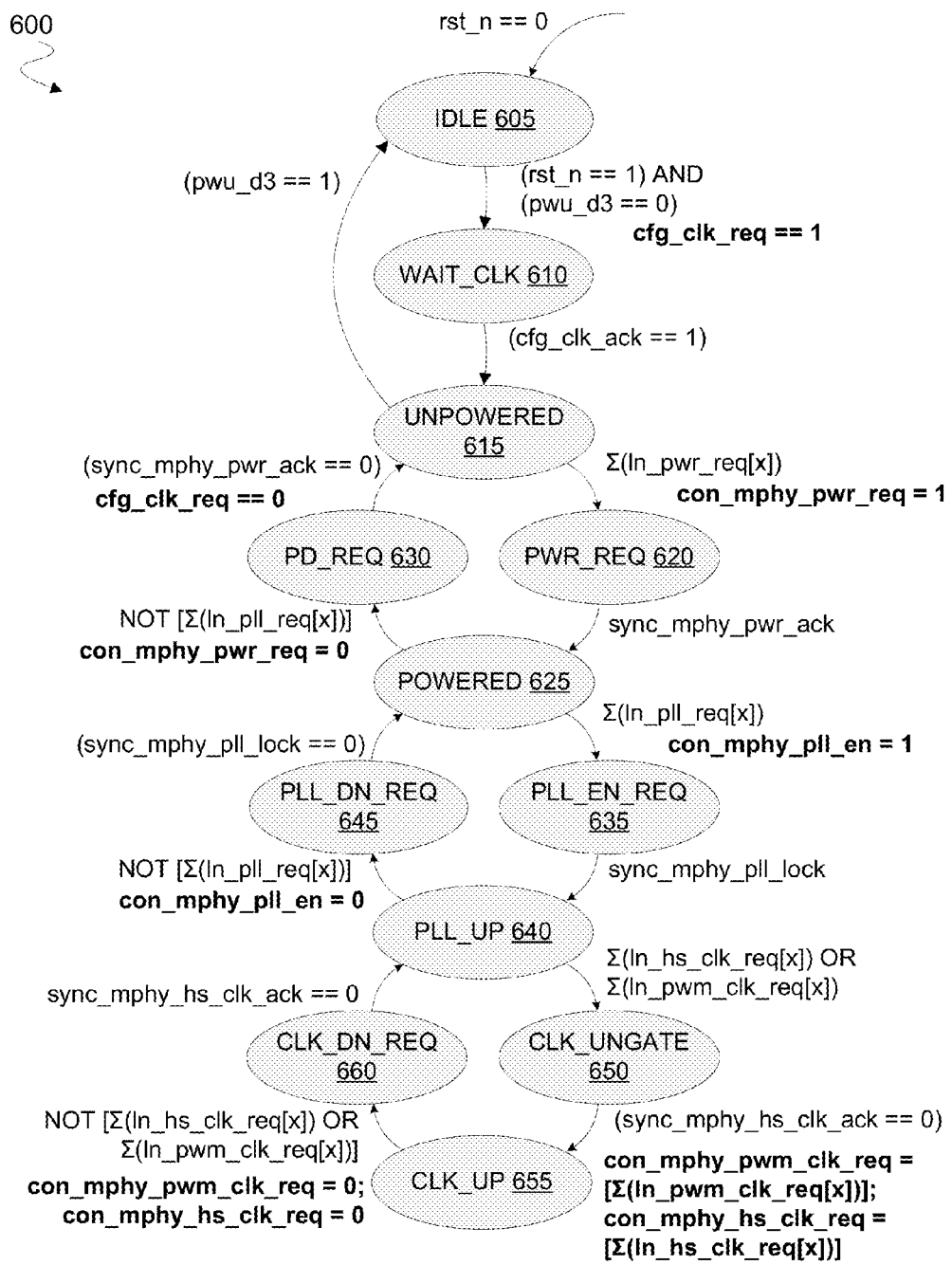
FIGS. 6, 7 and 8 are state diagrams each illustrating elements of respective common interface logic to access a physical layer according to a corresponding embodiment.
Figure 7:
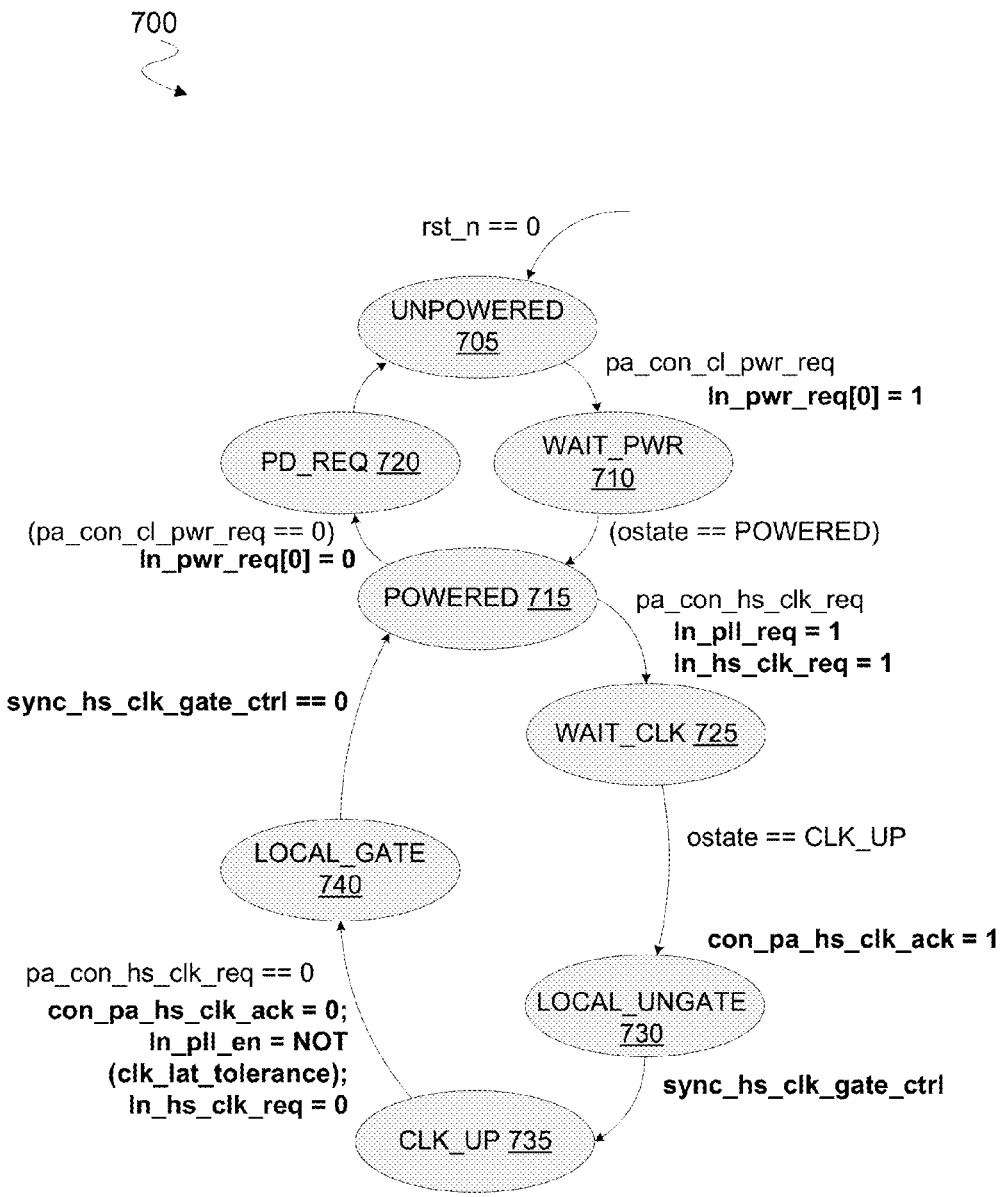
Figure 8:
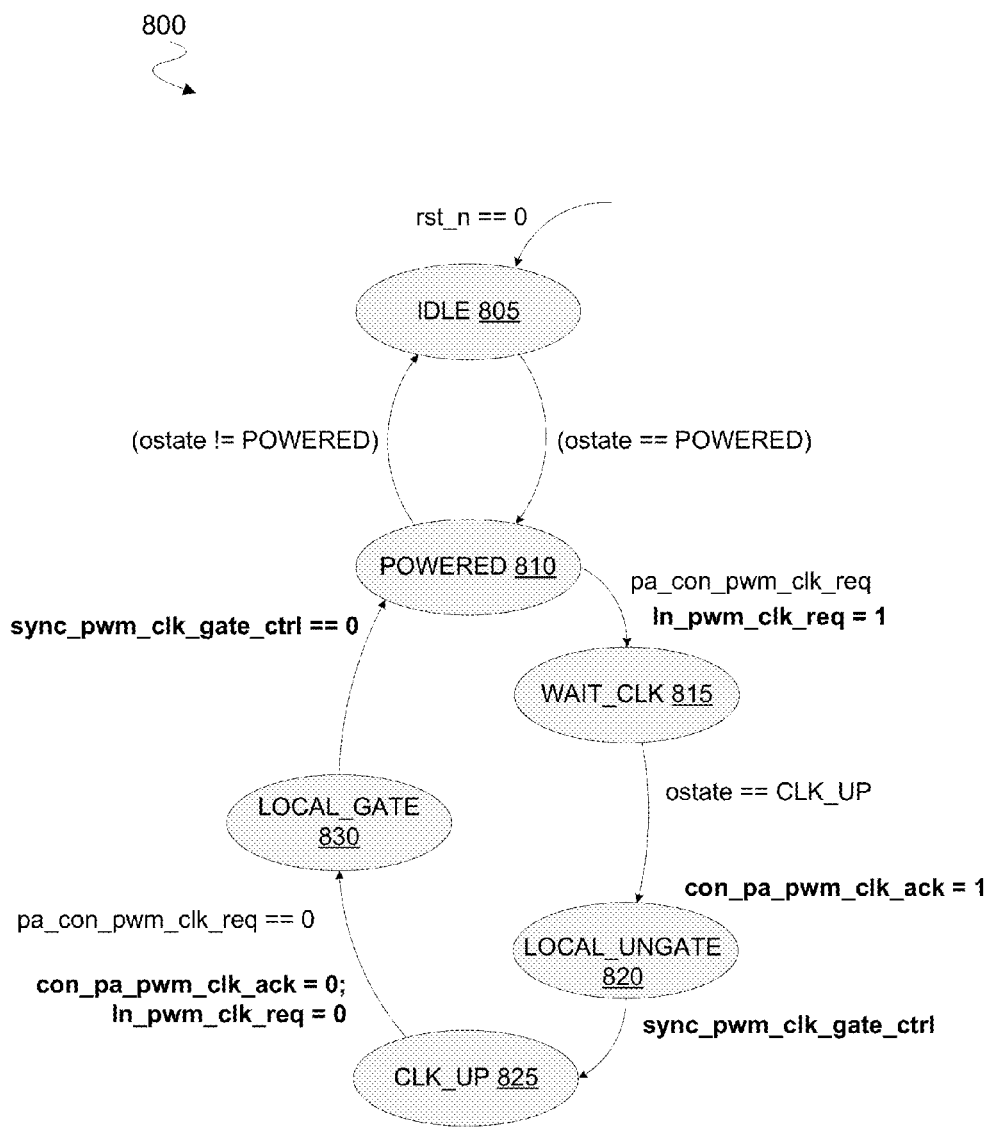

FIGS. 6, 7 and 8 illustrates respective state machines 600, 700, 800 of common interface logic each according to a corresponding embodiment. State machines 600, 700, 800 may provide the respective functionality of OSM 550, ISM 530 and ISM 535, for example. In FIGS. 6, 7 and 8, a signal identified with text that is not in bold represents a test condition that contributes to a corresponding state transition of that state machine. A signal identified with text that is in bold represents a signal output by a state machine based on (e.g., during) a corresponding state transition. In state machine 600, some test conditions and outputs are variously based on a respective detecting for any signal of a particular signal type. Such detecting is variously represented in FIG. 6 by a summation symbol (Σ). For example, Σ(ln_pwr_req (x)) is used in FIG. 6 to indicate that a transition from UNPOWERED 615 to PWR_REQ 620 takes place if any of multiple state machines of a CIL, the state machines variously providing functionality such as that of ISM 530, asserts its respective internal power request signal ln_pwr_req to OSM 550.

The various respective state transitions of state machines 600, 700, 800 are illustrated with reference to the signal exchanges implemented with device 500. However, such state transitions may be based on more, fewer and/or different signal exchanges, according to various embodiments. Tables 2, 3 and 4 below describe the various respective states of state machines 600, 700 and 800.

TABLE 2

| States of State Machine 600 | |
| --- | --- |
| State Name | Description |
| IDLE 605 | Reset state |
| WAIT_CLK 610 | Wait for configuration or reference clock |
| UNPOWERED 615 | Initial state when MPHY is not powered |
| PWR_REQ 620 | Power is requested to MPHY or other Parent CIL |
| POWERED 630 | Power is stable |
| PD_REQ 630 | Request power down to MPHY or other Parent CIL |
| PLL_EN_REQ 635 | Request for PLL to spin up |
| PLL_UP 640 | PLL is up and running |
| PLL_DN_REQ 645 | PLL is targeted for shutoff |
| CLK_UNGATE 650 | Request clocks to be ungated when PLL is stable |
| CLK_UP 655 | Clock is up |
| CLK_DN_REQ 660 | Clock gating requested |

TABLE 3

States of State Machine 700

| State Name | Description |
| --- | --- |
| UNPOWERED 705 | Reset state |
| WAIT_PWR 710 | Waiting state to get power up confirmation from OSM |
| POWERED 715 | OSM is powered |
| PD_REQ 720 | Request to power down a MPHY data lane |
| WAIT_CLK 725 | Wait for OSM to reach stable HS clock running state |
| LOCAL_UNGATE 730 | Release HS clock |
| CLK_UP 735 | Clock is stable |
| LOCAL_GATE 740 | Clock is in process of being gated upstream |

TABLE 4

States of State Machine 800

| State Name | Description |
| --- | --- |
| IDLE 805 | Reset state |
| POWERED 810 | OSM is powered |
| WAIT_CLK 815 | Wait for OSM to reach stable PWM clock running state |
| LOCAL_UNGATE 820 | Release PWM clock |
| CLK_UP 825 | Clock is stable |
| LOCAL_GATE 830 | Clocks is in process of being gated upstream |

Figure 9:
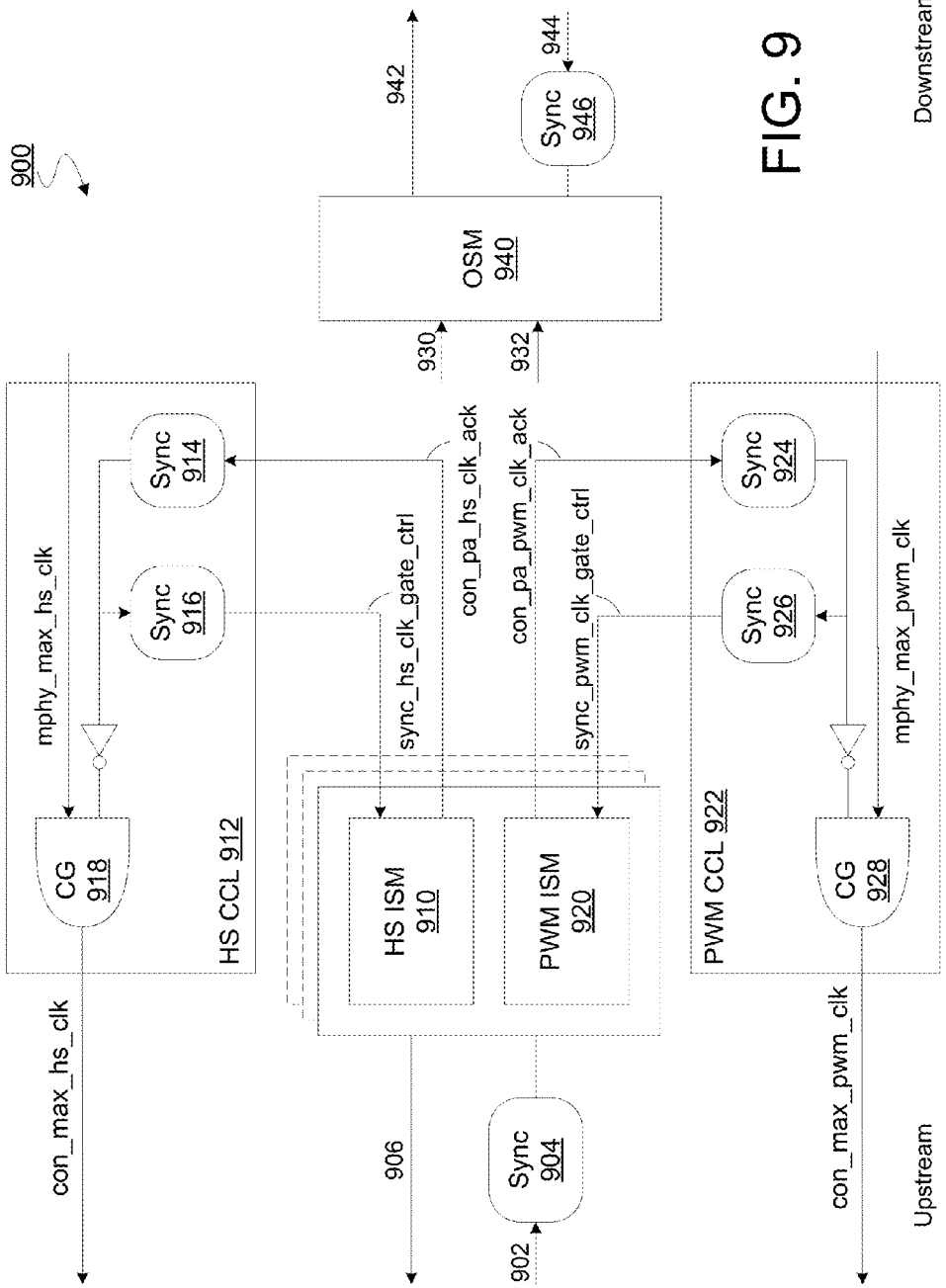
FIG. 9 is a high-level functional block diagram illustrating elements of a device to provide a common interface with physical layer circuitry according to an embodiment.

FIG. 9 illustrates elements of a device 900 to provide a common interface for different devices—and in some embodiments, different protocols—to variously access physical layer logic according to an embodiment. Device 900 may have some or all of the features of CIL 120, device 200 or device 500, for example. In an embodiment, device 900 is configured to perform some or all of method 300.

Device 900 includes a state machine 940 (providing functionality of OSM 550, for example) to participate in exchanges with one or more downstream devices—e.g., including a M-PHY and, in some embodiments, another device providing CIL functionality. Device 900 may be configured to couple via upstream interfaces (not shown) each to a different respective device. For each such upstream interface, device 900 may include respective circuitry that, of the upstream interfaces, is dedicated to exchanging, processing etc. signals exchanged only via one particular such interface. For example, circuitry dedicated to a particular one of such upstream interfaces may include a state machine HS ISM 910, another state machine PWM ISM 920, clock control logic HS CCL 912 and clock control logic PWM CCL 922. HS ISM 910, PWM ISM 920, HW CCL 912 and PWM CCL 922 may provide respective functionality of ISM 530, ISM 535, CCL 540 and 545, for example.

HS ISM 910 and PWM ISM 920 may variously transition between respective states based, at least in part, on requests 902 received via the corresponding upstream interface. Receipt of signals 902 may be timed by synchronization logic 904 that, for example, is responsive to a configuration clock signal cfg_clk (not shown). Based on such state transitions, HS ISM 910 and PWM ISM 920 may variously signal HS CCL 912 and PWM CCL 922, respectively, to selectively gate clock signals con_max_hs_clk and con_max_pwm_clk at different times. For example, HS ISM 910 may transmit an acknowledgement con_pa_hs_clk_ack to enable an output of con_max_hs_clk from a control gate CG 918 based on a downstream clock signal mphy_max_hs_clk. A synchronization feedback signal sync_hs_clk_gate_ctrl may be sent back from HS CCL 912 to regulate a state transition of HS ISM 910. Timing of such signal exchanges may be regulated by synchronization circuitry 914, 916 that, for example, is responsive to cfg_clk.

Alternatively or in addition, PWM ISM 920 may transmit an acknowledgement con_pa_pwm_clk_ack to enable an output of con_max_pwm_clk from a control gate CG 928 based on a downstream clock signal mphy_max_pwm_clk. A synchronization feedback signal sync_pwm_clk_gate_ctrl may be sent back from PWM CCL 922 to regulate a state transition of PWM ISM 920. Timing of such signal exchanges may be regulated by synchronization circuitry 924, 926 that, for example, is responsive to cfg_clk.

OSM 940 may variously receive internal request signals 930, 932 based on respective state transitions by HS ISM 910 and PWM ISM 920 (or alternatively, by state transitions of circuitry dedicated to another upstream interface of device 900). In response, OSM 940 may perform state transitions to generate signals 942 for downstream transmission. Based on signals 942, OSM 944 may receive responses 944 that, for example, are regulated by synchronization circuitry 946. Although certain embodiments are not limited in this regard, one or more acknowledgement signals 906 may be relayed to the upstream interface—e.g., by HS ISM 910, PWM ISM 920 and/or OSM 940 to indicate a current M-PHY power state.

Figure 10:
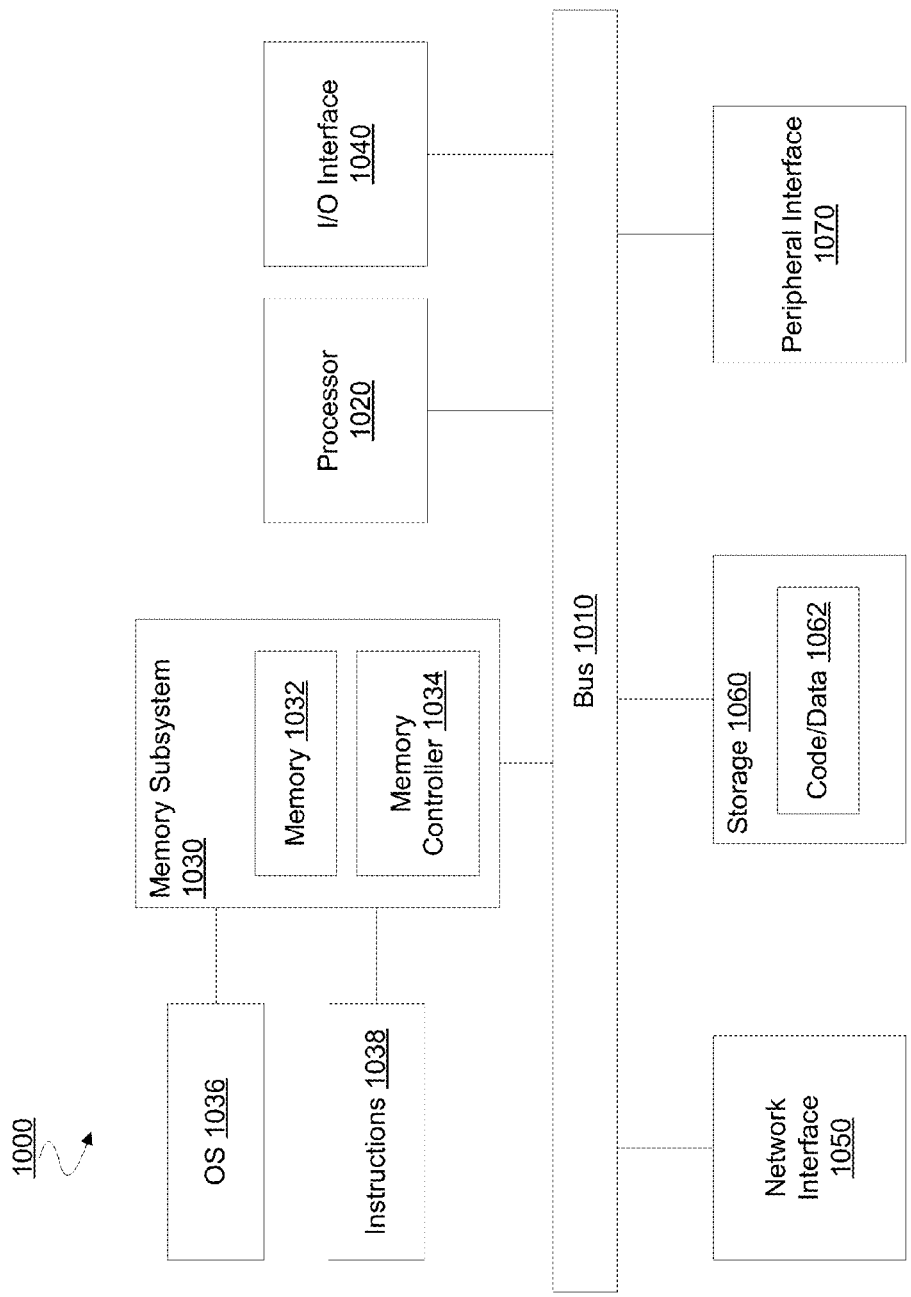
FIG. 10 is a block diagram illustrating elements of a computing system for providing access to physical layer circuitry according to an embodiment.

FIG. 10 is a block diagram of an embodiment of a computing system in which access to physical layer resources may be implemented. System 1000 represents a computing device in accordance with any embodiment described herein, and may be a laptop computer, a desktop computer, a server, a gaming or entertainment control system, a scanner, copier, printer, or other electronic device. System 1000 may include processor 1020, which provides processing, operation management, and execution of instructions for system 1000. Processor 1020 may include any type of microprocessor, central processing unit (CPU), processing core, or other processing hardware to provide processing for system 1000. Processor 1020 controls the overall operation of system 1000, and may be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 1030 represents the main memory of system 1000, and provides temporary storage for code to be executed by processor 1020, or data values to be used in executing a routine. Memory subsystem 1030 may include one or more memory devices such as read-only memory (ROM), flash memory, one or more varieties of random access memory (RAM), or other memory devices, or a combination of such devices. Memory subsystem 1030 stores and hosts, among other things, operating system (OS) 1036 to provide a software platform for execution of instructions in system 1000. Additionally, other instructions 1038 are stored and executed from memory subsystem 1030 to provide the logic and the processing of system 1000. OS 1036 and instructions 1038 are executed by processor 1020.

Memory subsystem 1030 may include memory device 1032 where it stores data, instructions, programs, or other items. In one embodiment, memory subsystem includes memory controller 1034 to access memory 1032—e.g., on behalf of processor 1020.

Processor 1020 and memory subsystem 1030 are coupled to bus/bus system 1010. Bus 1010 is an abstraction that represents any one or more separate physical buses, communication lines/interfaces, and/or point-to-point connections, connected by appropriate bridges, adapters, and/or controllers. Therefore, bus 1010 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 1010 may also correspond to interfaces in network interface 1050.

System 1000 may also include one or more input/output (I/O) interface(s) 1040, network interface 1050, one or more internal mass storage device(s) 1060, and peripheral interface 1070 coupled to bus 1010. I/O interface 1040 may include one or more interface components through which a user interacts with system 1000 (e.g., video, audio, and/or alphanumeric interfacing). Network interface 1050 provides system 1000 the ability to communicate with remote devices (e.g., servers, other computing devices) over one or more networks. Network interface 1050 may include an Ethernet adapter, wireless interconnection components, USB (universal serial bus), or other wired or wireless standards-based or proprietary interfaces. In an embodiment, system 1000 includes functionality discussed herein, such as that of system 100, to provide access to physical layer circuitry by multiple different protocol engines, protocol layer logic, etc. Such functionality may be included, for example, in I/O interface 1040, network interface 1050, peripheral interface 1070 or other component logic of device 1000.

Storage 1060 may be or include any conventional medium for storing large amounts of data in a nonvolatile manner, such as one or more magnetic, solid state, or optical based disks, or a combination. Storage 1060 holds code or instructions and data 1062 in a persistent state (i.e., the value is retained despite interruption of power to system 1000). Storage 1060 may be generically considered to be a "memory," although memory 1030 is the executing or operating memory to provide instructions to processor 1020. Whereas storage 1060 is nonvolatile, memory 1030 may include volatile memory (i.e., the value or state of the data is indeterminate if power is interrupted to system 1000).

Peripheral interface 1070 may include any hardware interface not specifically mentioned above. Peripherals refer generally to devices that connect dependently to system 1000. A dependent connection is one where system 1000 provides the software and/or hardware platform on which operation executes, and with which a user interacts.

Figure 11:
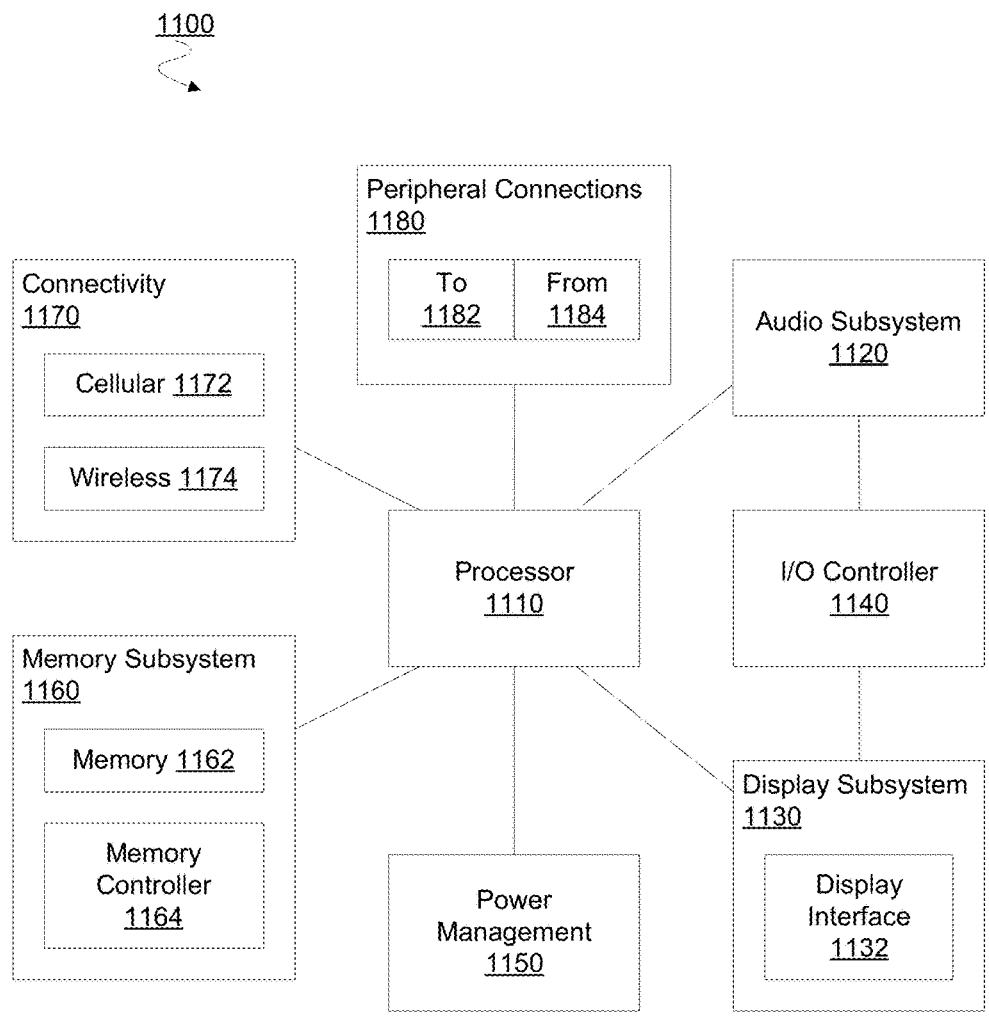
FIG. 11 is a block diagram illustrating elements of a mobile device for providing access to physical layer circuitry according to an embodiment.

FIG. 11 is a block diagram of an embodiment of a mobile device in which access to physical layer resources may be implemented. Device 1100 represents a mobile computing device, such as a computing tablet, a mobile phone or smartphone, a wireless-enabled e-reader, or other mobile device. It will be understood that certain of the components are shown generally, and not all components of such a device are shown in device 1100.

Device 1100 may include processor 1110, which performs the primary processing operations of device 1100. Processor 1110 may include one or more physical devices, such as microprocessors, application processors, microcontrollers, programmable logic devices, or other processing means. The processing operations performed by processor 1110 include the execution of an operating platform or operating system on which applications and/or device functions are executed. The processing operations include operations related to I/O (input/output) with a human user or with other devices, operations related to power management, and/or operations related to connecting device 1100 to another device. The processing operations may also include operations related to audio I/O and/or display I/O.

In one embodiment, device 1100 includes audio subsystem 1120, which represents hardware (e.g., audio hardware and audio circuits) and software (e.g., drivers, codecs) components associated with providing audio functions to the computing device. Audio functions may include speaker and/or headphone output, as well as microphone input. Devices for such functions may be integrated into device 1100, or connected to device 1100. In one embodiment, a user interacts with device 1100 by providing audio commands that are received and processed by processor 1110.

Display subsystem 1130 represents hardware (e.g., display devices) and software (e.g., drivers) components that provide a visual and/or tactile display for a user to interact with the computing device. Display subsystem 1130 may include display interface 1132, which may include the particular screen or hardware device used to provide a display to a user. In one embodiment, display interface 1132 includes logic separate from processor 1110 to perform at least some processing related to the display. In one embodiment, display subsystem 1130 includes a touchscreen device that provides both output and input to a user.

I/O controller 1140 represents hardware devices and software components related to interaction with a user. I/O controller 1140 may operate to manage hardware that is part of audio subsystem 1120 and/or display subsystem 1130. Additionally, I/O controller 1140 illustrates a connection point for additional devices that connect to device 1100 through which a user might interact with the system. For example, devices that may be attached to device 1100 might include microphone devices, speaker or stereo systems, video systems or other display device, keyboard or keypad devices, or other I/O devices for use with specific applications such as card readers or other devices.

As mentioned above, I/O controller 1140 may interact with audio subsystem 1120 and/or display subsystem 1130. For example, input through a microphone or other audio device may provide input or commands for one or more applications or functions of device 1100. Additionally, audio output may be provided instead of or in addition to display output. In another example, if display subsystem includes a touchscreen, the display device also acts as an input device, which may be at least partially managed by I/O controller 1140. There may also be additional buttons or switches on device 1100 to provide I/O functions managed by I/O controller 1140.

In one embodiment, I/O controller 1140 manages devices such as accelerometers, cameras, light sensors or other environmental sensors, gyroscopes, global positioning system (GPS), or other hardware that may be included in device 1100. The input may be part of direct user interaction, as well as providing environmental input to the system to influence its operations (such as filtering for noise, adjusting displays for brightness detection, applying a flash for a camera, or other features).

In one embodiment, device 1100 includes power management 1150 that manages battery power usage, charging of the battery, and features related to power saving operation. Memory subsystem 1160 may include memory device(s) 1162 for storing information in device 1100. Memory subsystem 1160 may include nonvolatile (state does not change if power to the memory device is interrupted) and/or volatile (state is indeterminate if power to the memory device is interrupted) memory devices. Memory 1160 may store application data, user data, music, photos, documents, or other data, as well as system data (whether long-term or temporary) related to the execution of the applications and functions of system 1100.

In one embodiment, memory subsystem 1160 includes memory controller 1164 (which could also be considered part of the control of system 1100, and could potentially be considered part of processor 1110). Memory controller 1164 may communicate signaling to access memory 1162—e.g., on behalf of processor 1110.

Connectivity 1170 may include hardware devices (e.g., wireless and/or wired connectors and communication hardware) and software components (e.g., drivers, protocol stacks) to enable device 1100 to communicate with external devices. The device could be separate devices, such as other computing devices, wireless access points or base stations, as well as peripherals such as headsets, printers, or other devices.

Connectivity 1170 may include multiple different types of connectivity. To generalize, device 1100 is illustrated with cellular connectivity 1172 and wireless connectivity 1174. Cellular connectivity 1172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 1174 refers to wireless connectivity that is not cellular, and may include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 1180 include hardware interfaces and connectors, as well as software components (e.g., drivers, protocol stacks) to make peripheral connections. It will be understood that device 1100 could both be a peripheral device ("to" 1182) to other computing devices, as well as have peripheral devices ("from" 1184) connected to it. Device 1100 commonly has a "docking" connector to connect to other computing devices for purposes such as managing (e.g., downloading and/or uploading, changing, synchronizing) content on device 1100. Additionally, a docking connector may allow device 1100 to connect to certain peripherals that allow device 1100 to control content output, for example, to audiovisual or other systems. In an embodiment, device 1100 includes functionality discussed herein, such as that of system 100, to provide access to physical layer circuitry by multiple different protocol engines, protocol layer logic, etc. Such functionality may be included, for example, in connectivity 1170, I/O controller 1140 or other component logic of device 1100.

In addition to a proprietary docking connector or other proprietary connection hardware, device 1100 may make peripheral connections 1180 via common or standards-based connectors. Common types may include a Universal Serial Bus (USB) connector (which may include any of a number of different hardware interfaces), DisplayPort including MiniDisplayPort (MDP), High Definition Multimedia Interface (HDMI), Firewire, or other type.

Techniques and architectures for providing access to physical layer resources are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit comprising:
    first circuitry including:
        a first state machine configured to transition among first states based on both a request for power and a request for a first clock signal each on behalf of a first port controller, the first state machine further to generate a first control signal;
        a second state machine configured to transition among second states based on a request for a second clock signal on behalf of the first port controller, wherein a first frequency of the first clock signal is greater than a second frequency of the second clock signal, the second state machine further to generate a second control signal; and
        first clock control logic responsive to the first control signal to transmit the first clock signal toward the first port controller, and further responsive to the second control signal to transmit the second clock signal toward the first port controller; and
    a third state machine configured to transition among third states based on requests from the first state machine and the second state machine, the third state machine to send from the first circuitry to physical layer circuitry requests on behalf of the first port controller.

2. The integrated circuit of claim 1, further comprising:
    second circuitry to receive requests from a second port controller, the second circuitry to send requests to the third state machine on behalf of the second port controller, wherein the third state machine is configured to transition between the third states in response to requests from either one of the first circuitry and the second circuitry.

3. The integrated circuit of claim 2, wherein the second circuitry comprises:
    a fourth state machine to transition among fourth states based on both a request for power and a request for the first clock signal each on behalf of a second port controller, the fourth state machine to generate a fourth control signal;
    a fifth state machine to transition among fifth states based on a request for the second clock signal on behalf of the second port controller, the fifth state machine to generate a fifth control signal; and
    second clock control logic to transmit the first clock signal toward the second port controller in response to the fourth control signal and to transmit the second clock signal toward the second port controller in response to the fifth control signal.

4. The integrated circuit of claim 1, wherein a first functional block of the integrated circuit includes the first circuitry, the integrated circuit further comprising a second functional block, wherein more than two port controllers are coupled to access the physical layer circuitry via a hierarchical interface architecture including the first functional block and the second functional block.

5. The integrated circuit of claim 4, wherein port controllers each supporting a first protocol are coupled to the first functional block via the second functional block, and wherein another port controller supporting a second protocol is coupled to the first functional block independent of the second functional block.

6. The integrated circuit of claim 1, wherein the integrated circuit resides on a system-on-chip including the first port controller or the physical layer circuitry.

7. The integrated circuit of claim 1, wherein the physical layer circuitry is compatible with includes a mobile physical layer (M-PHY) specification.

8. The integrated circuit of claim 1, wherein the first port controller supports communications compatible with a SuperSpeed USB Inter-chip specification.

9. The integrated circuit of claim 1, wherein the first port controller supports communications compatible with a Universal Flash Storage specification.

10. The integrated circuit of claim 1, wherein the first port controller supports communications compatible with a Mobile Peripheral Component Interconnect Express specification.

11. A method at an integrated circuit, the method comprising:
    transitioning a first state machine of first circuitry among first states based on both a request for power and a request for a first clock signal each on behalf of a first port controller;
    transitioning a second state machine of the first circuitry among second states based on a request for a second clock signal on behalf of the first port controller, wherein a first frequency of the first clock signal is greater than a second frequency of the second clock signal;
    in response to a first control signal from the first state machine, transmitting the first clock signal from first clock control logic of the first circuitry toward the first port controller;
    in response to a second control signal from the second state machine, transmitting the second clock signal from the first clock control logic of the first circuitry toward the first port controller;
    transitioning a third state machine of the first circuitry among third states based on requests from the first state machine and the second state machine; and
    sending requests on behalf of the first port controller from the third state machine to physical layer circuitry.

12. The method of claim 11, further comprising:
    with second circuitry of the integrated circuit:
        receiving requests from a second port controller; and
        sending requests to the third state machine on behalf of the second port controller; and
        further transitioning the third state machine between the third states in response to requests from the second circuitry.

13. The method of claim 12, further comprising:
    transitioning a fourth state machine of the second circuitry among fourth states based on both a request for power and a request for the first clock signal each on behalf of a second port controller;
    generating a fourth control signal with the fourth state machine;
    transitioning a fifth state machine of the second circuitry among fifth states based on a request for the second clock signal on behalf of the second port controller;
    generating a fifth control signal with the fifth state machine;

transmitting the first clock signal from second clock control logic of the second circuitry toward the second port controller in response to the fourth control signal; and transmitting the second clock signal from the second clock control logic toward the second port controller in response to the fifth control signal.

14. The method of claim 11, wherein a first functional block of the integrated circuit includes the first circuitry, the integrated circuit further comprising a second functional block, wherein more than two port controllers are coupled to access the physical layer circuitry via a hierarchical interface architecture including the first functional block and the second functional block.

15. The method of claim 14, wherein port controllers each supporting a first protocol are coupled to the first functional block via the second functional block, and wherein another port controller supporting a second protocol is coupled to the first functional block independent of the second functional block.

16. The method of claim 11, wherein the integrated circuit resides on a system-on-chip including the first port controller or the physical layer circuitry.

17. The method of claim 11, wherein the physical layer circuitry is compatible with includes a mobile physical layer (M-PHY) specification.

18. A system comprising
an integrated circuit including:
    first circuitry comprising:
        a first state machine configured to transition among first states based on both a request for power and a request for a first clock signal each on behalf of a first port controller, the first state machine further to generate a first control signal;
        a second state machine configured to transition among second states based on a request for a second clock signal on behalf of the first port controller, wherein a first frequency of the first clock signal is greater than a second frequency of the second clock signal, the second state machine further to generate a second control signal; and
        first clock control logic responsive to the first control signal to transmit the first clock signal toward the first port controller, and further responsive to the second control signal to transmit the second clock signal toward the first port controller; and
        a third state machine configured to transition among third states based on requests from the first state machine and the second state machine, the third state machine to send from the first circuitry to physical layer circuitry requests on behalf of the first port controller; and
    a touchscreen to present a display based on an exchange via the first port controller.

19. The system of claim 18, the integrated circuit further comprising:
    second circuitry to receive requests from a second port controller, the second circuitry to send requests to the third state machine on behalf of the second port controller, wherein the third state machine is configured to transition between the third states in response to requests from either one of the first circuitry and the second circuitry.

20. The system of claim 19, wherein the second circuitry comprises:
    a fourth state machine to transition among fourth states based on both a request for power and a request for the first clock signal each on behalf of a second port controller, the fourth state machine to generate a fourth control signal;
    a fifth state machine to transition among fifth states based on a request for the second clock signal on behalf of the second port controller, the fifth state machine to generate a fifth control signal; and
    second clock control logic to transmit the first clock signal toward the second port controller in response to the fourth control signal and to transmit the second clock signal toward the second port controller in response to the fifth control signal.

21. The system of claim 18, wherein a first functional block of the integrated circuit includes the first circuitry, the integrated circuit further comprising a second functional block, wherein more than two port controllers are coupled to access the physical layer circuitry via a hierarchical interface architecture including the first functional block and the second functional block.

22. The system of claim 21, wherein port controllers each supporting a first protocol are coupled to the first functional block via the second functional block, and wherein another port controller supporting a second protocol is coupled to the first functional block independent of the second functional block.

23. The system of claim 18, wherein the integrated circuit resides on a system-on-chip including the first port controller or the physical layer circuitry.

* * * * *